(12) United States Patent
Daimon

(10) Patent No.: US 12,215,485 B2
(45) Date of Patent: Feb. 4, 2025

(54) DISPLAY SYSTEM OF WORK MACHINE AND METHOD OF CONTROLLING THE SAME

(71) Applicant: KOMATSU LTD., Tokyo (JP)

(72) Inventor: Masaki Daimon, Tokyo (JP)

(73) Assignee: KOMATSU LTD., Tokyo (JP)

( * ) Notice: Subject to any disclaimer, the term of this patent is extended or adjusted under 35 U.S.C. 154(b) by 799 days.

(21) Appl. No.: 17/053,119

(22) PCT Filed: Aug. 28, 2019

(86) PCT No.: PCT/JP2019/033633
§ 371 (c)(1),
(2) Date: Nov. 5, 2020

(87) PCT Pub. No.: WO2020/054411
PCT Pub. Date: Mar. 19, 2020

(65) Prior Publication Data
US 2021/0310216 A1 Oct. 7, 2021

(30) Foreign Application Priority Data
Sep. 14, 2018 (JP) ................. 2018-172800

(51) Int. Cl.
*E02F 9/26* (2006.01)
*E02F 9/22* (2006.01)
(52) U.S. Cl.
CPC ............ *E02F 9/26* (2013.01); *B60R 2300/50* (2013.01); *B60R 2300/80* (2013.01); *E02F 9/2225* (2013.01)

(58) Field of Classification Search
CPC .. E02F 9/26; E02F 9/2225; B60R 1/00; B60R 2300/50; B60R 2300/80
USPC ......................................................... 701/33.4
See application file for complete search history.

(56) References Cited

U.S. PATENT DOCUMENTS

| | | |
|---|---|---|
| 9,546,470 B2 | 1/2017 | Jeong |
| 2002/0109679 A1 | 8/2002 | Masunaga |
| 2003/0001751 A1 | 1/2003 | Ogura et al. |
| 2007/0213855 A1 | 9/2007 | Furuno et al. |
| 2007/0282577 A1 | 12/2007 | Lind |
| 2009/0288636 A1 | 11/2009 | Saito et al. |
| 2010/0324788 A1 | 12/2010 | Toda |
| 2011/0208428 A1 | 8/2011 | Matsubara et al. |

(Continued)

FOREIGN PATENT DOCUMENTS

| | | |
|---|---|---|
| CN | 1395641 A | 2/2003 |
| CN | 1603528 A | 4/2005 |

(Continued)

OTHER PUBLICATIONS

English Translation for JP2018003282A (Year: 2023).*

(Continued)

*Primary Examiner* — Mahmoud S Ismail
(74) *Attorney, Agent, or Firm* — Faegre Drinker Biddle & Reath LLP

(57) ABSTRACT

A display system of a work machine includes a storage that stores time-series work machine motion information including motion information of the work machine, a motion image generator that generates a motion image of the work machine based on the work machine motion information, and a display that shows the motion image.

19 Claims, 10 Drawing Sheets

(56) References Cited

U.S. PATENT DOCUMENTS

| | | |
|---|---|---|
| 2013/0169690 A1 | 7/2013 | Gotou et al. |
| 2013/0222573 A1 | 8/2013 | Onuma et al. |
| 2014/0052349 A1 | 2/2014 | Tsukane |
| 2014/0330490 A1 | 11/2014 | Aoki et al. |
| 2014/0347396 A1* | 11/2014 | Nielsen .................. G07C 5/085 345/634 |
| 2015/0354178 A1 | 12/2015 | Jeong |
| 2016/0035120 A1 | 2/2016 | Delplace |
| 2016/0207537 A1 | 7/2016 | Urano et al. |
| 2016/0259362 A1 | 9/2016 | Suzaki et al. |
| 2017/0016211 A1 | 1/2017 | Arimatsu et al. |
| 2018/0023970 A1 | 1/2018 | Iguchi |
| 2018/0151070 A1 | 5/2018 | Katou et al. |
| 2018/0202130 A1 | 7/2018 | Morimoto |
| 2018/0216318 A1 | 8/2018 | Shike |
| 2018/0222390 A1 | 8/2018 | Imaizumi et al. |
| 2019/0048560 A1 | 2/2019 | Misaki |
| 2019/0112791 A1 | 4/2019 | Ariga et al. |
| 2019/0162551 A1 | 5/2019 | Kean |

FOREIGN PATENT DOCUMENTS

| | | |
|---|---|---|
| CN | 2905556 Y | 5/2007 |
| CN | 201151929 Y | 11/2008 |
| CN | 101542093 A | 9/2009 |
| CN | 101696659 A | 4/2010 |
| CN | 102653233 A | 9/2012 |
| CN | 105555578 A | 5/2016 |
| CN | 107431789 A | 12/2017 |
| CN | 107542122 A | 1/2018 |
| CN | 108026715 A | 5/2018 |
| EP | 01816267 A1 | 8/2007 |
| EP | 02712969 A1 | 4/2014 |
| EP | 03226553 A1 | 10/2017 |
| JP | S 59-068447 A | 4/1984 |
| JP | H10-046813 A | 2/1998 |
| JP | 2004-252024 A | 9/2004 |
| JP | 2008-011379 A | 1/2008 |
| JP | 2008-144379 A | 6/2008 |
| JP | 2015-164847 A | 9/2015 |
| JP | 2016-089388 A | 5/2016 |
| JP | 2016-098535 A | 5/2016 |
| JP | 2016-103301 A | 6/2016 |
| JP | 6251453 B1 | 12/2017 |
| JP | 2018003282 A * | 1/2018 |
| WO | WO 2017/061515 A1 | 4/2017 |
| WO | WO 2017/183707 A1 | 10/2017 |
| WO | WO 2018/061454 A1 | 4/2018 |

OTHER PUBLICATIONS

Office Action dated Mar. 7, 2022 that issued in U.S. Appl. No. 17/054,215.

Office Action dated Nov. 10, 2021 that issued in U.S. Appl. No. 17/054,215.

Office Action dated Oct. 5, 2022 that issued in U.S. Appl. No. 17/054,215.

Office Action dated May 18, 2022 that issued in U.S. Appl. No. 17/054,215.

* cited by examiner

FIG.6

| TIME | EVENT | VEHICLE INFORMATION | OPERATION INFORMATION | POSITION INFORMATION | OPERATOR ID | VEHICULAR BODY ID |
|---|---|---|---|---|---|---|
| 12:01:01 | EXCAVATION | CN0 | T0 | P0 | A | X |
| 12:01:05 | EXCAVATION | CN1 | T1 | P1 | A | X |
| 12:01:10 | EXCAVATION | CN2 | T2 | P2 | A | X |
| ... | ... | ... | ... | ... | ... | ... |
| 12:02:00 | LOADED FORWARD TRAVEL | CN3 | T3 | P3 | A | X |
| 12:02:04 | LOADED FORWARD TRAVEL | CN4 | T4 | P4 | A | X |
| ... | ... | ... | ... | ... | ... | ... |

DISPLAY SYSTEM OF WORK MACHINE AND METHOD OF CONTROLLING THE SAME

CROSS-REFERENCE TO RELATED APPLICATIONS

This application is a 371 of International Patent Application No. PCT/JP2019/033633, filed Aug. 28, 2019, which claims the benefit of priority to Japanese Patent Application No. 2018-172800, filed Sep. 14, 2018, the entire contents of each of which are incorporated herein by reference.

TECHNICAL FIELD

The present invention relates to a work machine.

BACKGROUND ART

A work machine such as a wheel loader includes a bucket pivotable in a direction of dumping at a tip end of a boom pivotable in an upward/downward direction. An operator performs an excavation work by operating an operation apparatus to pivot the bucket in the direction of dumping to set the bucket at a substantially horizontal position and to thereafter run the work machine to push the bucket into a pile of soil. An object is thus loaded into the bucket. The operator revolves the boom or a vehicular body to have the work machine face a transportation machine such as a dump truck, and raises the boom above a box. As the operator pivots the bucket in the direction of dumping, the object loaded in the bucket falls on the box and the object is transferred to the transportation machine. By repeating such a cycle a plurality of times, a loading work is performed.

In a motion of a work machine such as a wheel loader, an accelerator for running the work machine should be operated and levers for operating the boom and the bucket should be operated to control motions of the bucket. Therefore, it is not easy to realize efficient motions and skills are required. Therefore, a function to check a motion state of the work machine to allow training for driving is demanded.

In this connection, for example, Japanese Patent Laying-Open No. 2016-89388 discloses a technique to transmit information to a remote facility to give the information to an operator who remotely steers the work machine at the remote facility. In the publication, however, information during works is merely directly given to the operator.

CITATION LIST

Patent Literature

PTL 1: Japanese Patent Laying-Open No. 2016-89388

SUMMARY OF INVENTION

Technical Problem

In this connection, the present invention was made to solve the problem above, and an object thereof is to provide a display system of a work machine capable of showing a motion state of the work machine and a method of controlling the same.

Solution to Problem

A display system of a work machine according to the present invention includes a storage that stores time-series work machine motion information including motion information of the work machine, a motion image generator that generates a motion image of the work machine based on the work machine motion information, and a display that shows the motion image.

A method of controlling a display system of a work machine according to the present invention includes storing time-series work machine motion information including motion information of the work machine, generating a motion image of the work machine based on the work machine motion information, and showing the motion image.

Advantageous Effects of Invention

The display system of the work machine and the method of controlling the same according to the present invention can show a motion state of the work machine.

BRIEF DESCRIPTION OF DRAWINGS

FIG. 6 is a diagram illustrating a work machine table stored in a memory 73 according to the embodiment.

DESCRIPTION OF EMBODIMENTS

Though an embodiment according to the present invention will be described below with reference to the drawings, the present invention is not limited thereto. Constituent elements in each embodiment described below can be combined as appropriate. Some of the constituent elements may not be used.

[Overall Configuration]

Figure 1:
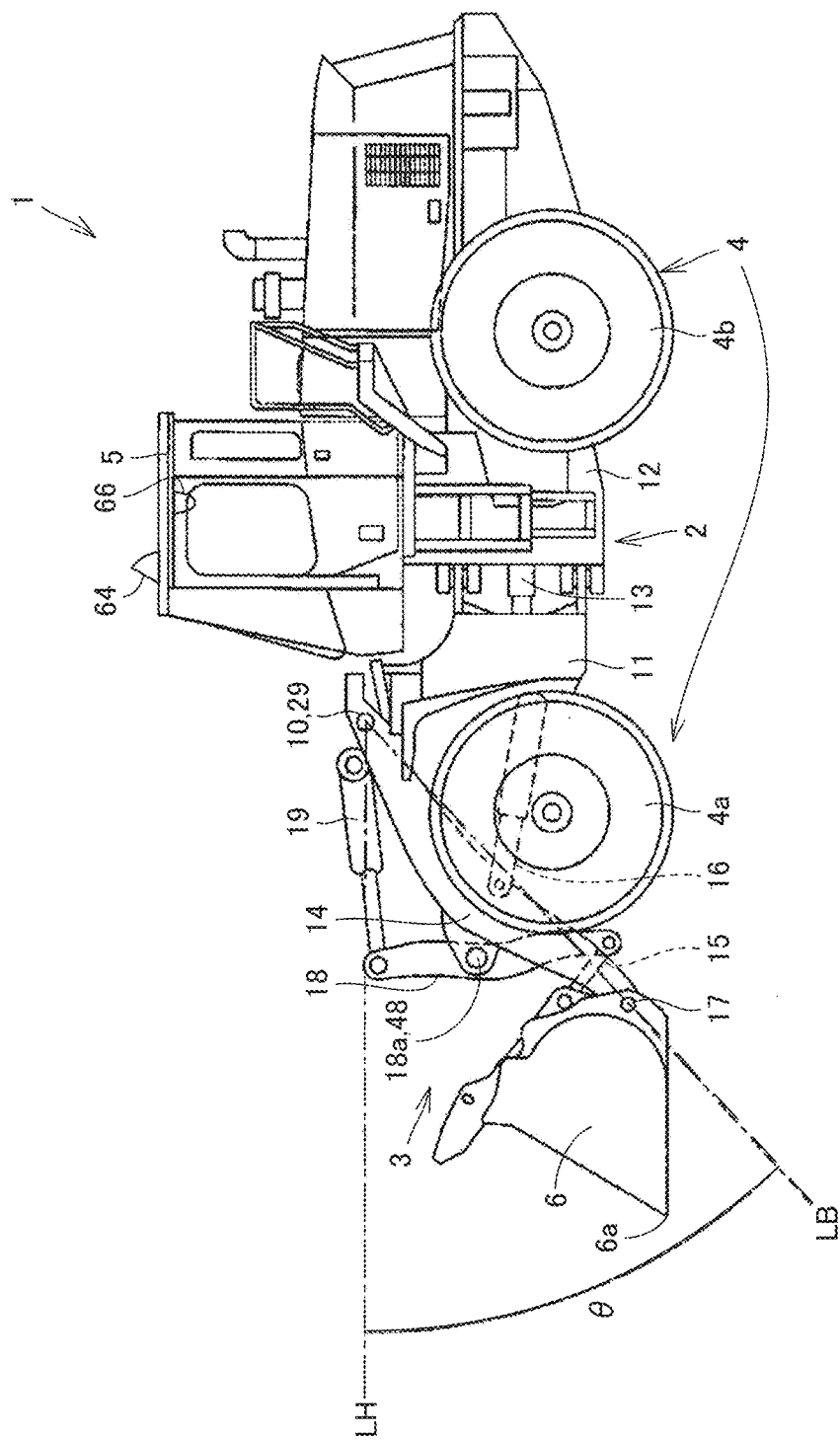
FIG. 1 is a side view of a wheel loader 1 as an exemplary work machine according to an embodiment.

A wheel loader 1 as an exemplary work machine will be described in an embodiment. FIG. 1 is a side view of wheel loader 1 as an exemplary work machine according to the embodiment. As shown in FIG. 1, wheel loader 1 includes a vehicular body frame 2, a work implement 3, a traveling unit 4, and a cab 5. A vehicular body of wheel loader 1 is constituted of vehicular body frame 2, cab 5, and the like. Work implement 3 and traveling unit 4 are attached to the vehicular body of wheel loader 1.

Traveling unit 4 runs the vehicular body of wheel loader 1 and includes running wheels 4a and 4b. Wheel loader 1 can be self-propelled as running wheels 4a and 4b are rotationally driven, and can perform a desired work with work implement 3.

Vehicular body frame 2 includes a front frame 11 and a rear frame 12. Front frame 11 and rear frame 12 are attached to each other in a manner swingable in a lateral direction. A steering cylinder 13 is attached to front frame 11 and rear frame 12. Steering cylinder 13 is a hydraulic cylinder. As steering cylinder 13 extends and contracts as being driven by hydraulic oil from a steering pump (not shown), a direction of travel of wheel loader 1 is laterally changed.

A direction in which wheel loader 1 travels in straight lines is herein referred to as a fore/aft direction of wheel loader 1. In the fore/aft direction of wheel loader 1, a side where work implement 3 is arranged with respect to vehicular body frame 2 is defined as the fore direction and a direction opposite to the fore direction is defined as the aft direction. A lateral direction of wheel loader 1 is a direction orthogonal to the fore/aft direction in a plan view. A right side and a left side in the lateral direction in facing front are defined as a right direction and a left direction, respectively. An upward/downward direction of wheel loader 1 is a direction orthogonal to the plane defined by the fore/aft direction and the lateral direction. A side in the upward/downward direction where the ground is located is defined as a lower side and a side where the sky is located is defined as an upper side.

The fore/aft direction refers to a fore/aft direction of an operator who sits at an operator's seat in cab 5. The lateral direction refers to a lateral direction of the operator who sits at the operator's seat. The lateral direction refers to a direction of a vehicle width of wheel loader 1. The upward/downward direction refers to an upward/downward direction of the operator who sits at the operator's seat. A direction in which the operator sitting at the operator's seat faces is defined as the fore direction and a direction behind the operator sitting at the operator's seat is defined as the aft direction. A right side and a left side at the time when the operator sitting at the operator's seat faces front are defined as the right direction and the left direction, respectively. A foot side of the operator who sits at the operator's seat is defined as a lower side, and a head side is defined as an upper side.

Work implement 3 and running wheel (front wheel) 4a are attached to front frame 11. Work implement 3 includes a boom 14 and a bucket 6. A base end of boom 14 is rotatably attached to front frame 11 by a boom pin 10. Bucket 6 is rotatably attached to boom 14 by a bucket pin 17 located at a tip end of boom 14. Front frame 11 and boom 14 are coupled to each other by a boom cylinder 16. Boom cylinder 16 is a hydraulic cylinder. As boom cylinder 16 extends and contracts as being driven by hydraulic oil from a work implement pump 25 (see FIG. 2), boom 14 moves upward and downward. Boom cylinder 16 drives boom 14.

Work implement 3 further includes a bell crank 18, a tilt cylinder 19, and a tilt rod 15. Bell crank 18 is rotatably supported on boom 14 by a support pin 18a located substantially in the center of boom 14. Tilt cylinder 19 couples a base end of bell crank 18 and front frame 11 to each other. Tilt rod 15 couples a tip end of bell crank 18 and bucket 6 to each other. Tilt cylinder 19 is a hydraulic cylinder. As tilt cylinder 19 extends and contracts as being driven by hydraulic oil from work implement pump 25 (see FIG. 2), bucket 6 pivots upward and downward. Tilt cylinder 19 drives bucket 6.

Cab 5 and running wheel (rear wheel) 4b are attached to rear frame 12. Cab 5 is arranged in the rear of boom 14. Cab 5 is carried on vehicular body frame 2. A seat where an operator sits and an operation apparatus are arranged in cab 5.

A position detection sensor 64 is arranged on an upper celling side of cab 5. Position detection sensor 64 includes a GNSS antenna and a global coordinate operator. The GNSS antenna is an antenna for a real time kinematic-global navigation satellite system (RTK-GNSS). An inertial measurement unit (IMU) 66 is arranged in cab 5. IMU 66 detects an inclination of vehicular body frame 2. IMU 66 detects an angle of inclination of vehicular body frame 2 with respect to the fore/aft direction and the lateral direction.

Figure 2:
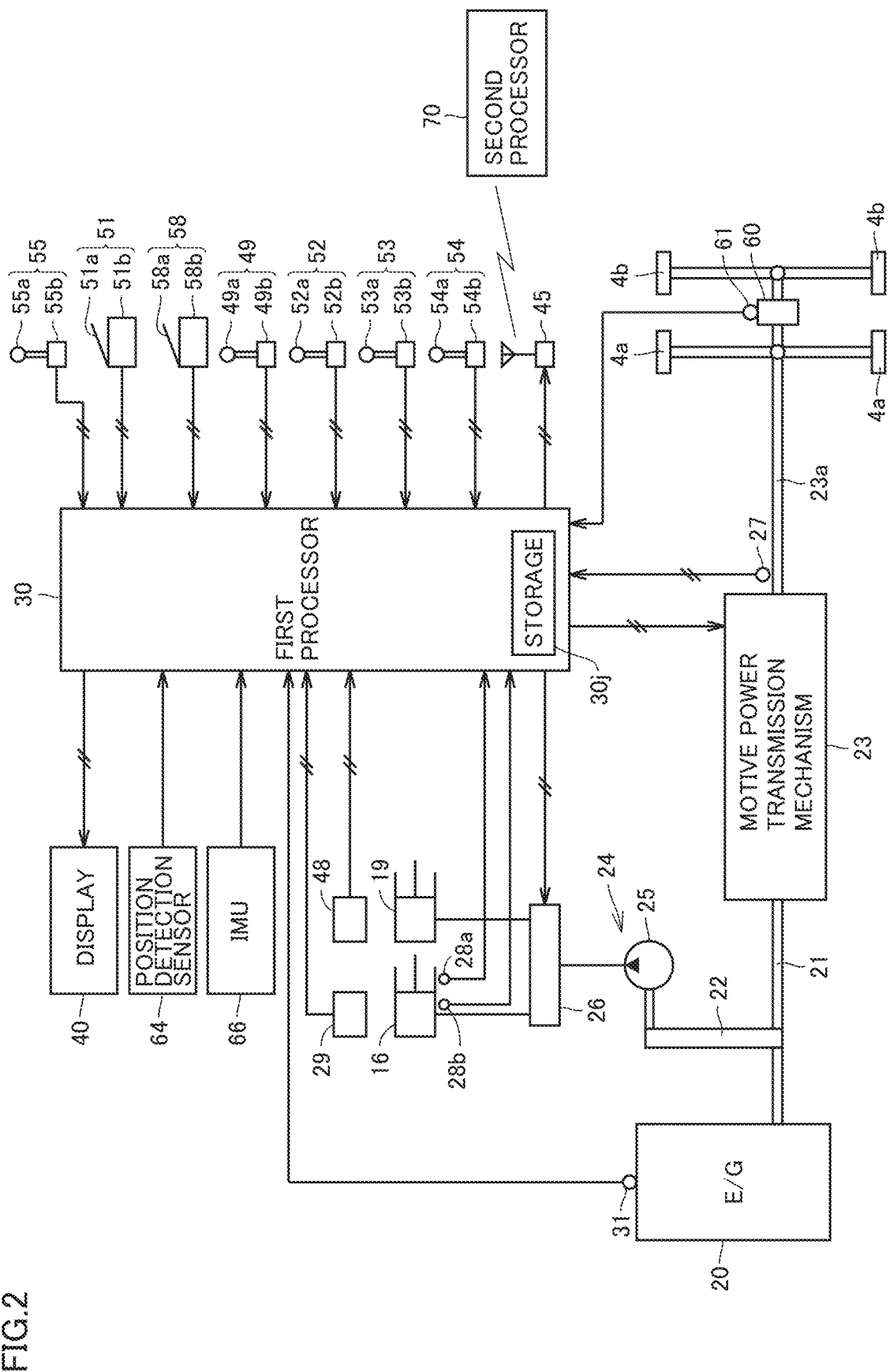
FIG. 2 is a schematic block diagram showing a configuration of the entire system including wheel loader 1 according to the embodiment.

FIG. 2 is a schematic block diagram showing a configuration of the entire system including wheel loader 1 according to the embodiment. Referring to FIG. 2, the entire system according to the embodiment includes wheel loader 1 and a second processor provided to be able to establish wireless or wired communication with wheel loader 1.

Wheel loader 1 includes an engine 20, a motive power extraction unit 22, a motive power transmission mechanism 23, a cylinder driving unit 24, a first angle detector 29, a second angle detector 48, a pivot mechanism 60, and a first processor 30 (a controller).

Engine 20 is, for example, a diesel engine. Output from engine 20 is controlled by adjusting an amount of fuel to be injected into a cylinder of engine 20. Engine 20 is provided with a temperature sensor 31. Temperature sensor 31 outputs a detection signal representing a temperature to first processor 30.

Motive power extraction unit 22 is an apparatus that distributes output from engine 20 to motive power transmission mechanism 23 and cylinder driving unit 24. Motive power transmission mechanism 23 is a mechanism that transmits driving force from engine 20 to front wheel 4a and rear wheel 4b, and it is implemented, for example, by a transmission. Motive power transmission mechanism 23 changes a speed of rotation of an input shaft 21 and outputs resultant rotation to an output shaft 23a. A vehicle speed detection unit 27 that detects a speed of wheel loader 1 is attached to output shaft 23a of motive power transmission mechanism 23. Wheel loader 1 includes vehicle speed detection unit 27.

Vehicle speed detection unit 27 is implemented, for example, by a vehicle speed sensor. Vehicle speed detection unit 27 detects a speed of movement of wheel loader 1 by traveling unit 4 (FIG. 1) by detecting a rotation speed of output shaft 23a. Vehicle speed detection unit 27 functions as a rotation sensor that detects a rotation speed of output shaft 23a. Vehicle speed detection unit 27 functions as a movement detector that detects movement by traveling unit 4. Vehicle speed detection unit 27 outputs a detection signal representing a vehicle speed of wheel loader 1 to first processor 30.

Cylinder driving unit 24 includes work implement pump 25 and a control valve 26. Output from engine 20 is transmitted to work implement pump 25 through motive power extraction unit 22. Hydraulic oil delivered from work implement pump 25 is supplied to boom cylinder 16 and tilt cylinder 19 through control valve 26.

First hydraulic pressure detectors 28a and 28b that detect a hydraulic pressure in an oil chamber in boom cylinder 16 are attached to boom cylinder 16. Wheel loader 1 includes first hydraulic pressure detectors 28a and 28b. First hydraulic pressure detectors 28a and 28b include, for example, a pressure sensor 28a for head pressure detection and a pressure sensor 28b for bottom pressure detection.

Pressure sensor 28a is attached to a head side of boom cylinder 16. Pressure sensor 28a can detect a pressure (a head pressure) of hydraulic oil in the oil chamber on a side of a cylinder head of boom cylinder 16. Pressure sensor 28a outputs a detection signal representing a head pressure of boom cylinder 16 to first processor 30. Pressure sensor 28b is attached to a bottom side of boom cylinder 16. Pressure sensor 28b can detect a pressure (a bottom pressure) of hydraulic oil in the oil chamber on a side of a cylinder bottom of boom cylinder 16. Pressure sensor 28b outputs a detection signal representing a bottom pressure of boom cylinder 16 to first processor 30.

For example, a potentiometer attached to boom pin 10 is employed as first angle detector 29. First angle detector 29 detects a boom angle representing a lift angle (a tilt angle) of boom 14. First angle detector 29 outputs a detection signal representing a boom angle to first processor 30. Specifically, as shown in FIG. 1, a boom angle θ represents an angle of a straight line LB extending in a direction from the center of boom pin 10 toward the center of bucket pin 17 with respect to a horizontal line extending forward from the center of boom pin 10. A case that straight line LB is horizontal is defined as boom angle θ=0°. A case that straight line LB is located above the horizontal line is defined as a positive boom angle θ. A case that straight line LB is located below the horizontal line is defined as a negative boom angle θ. A stroke sensor arranged in boom cylinder 16 may be employed as first angle detector 29.

For example, a potentiometer attached to support pin 18a is employed as second angle detector 48. Second angle detector 48 detects a bucket angle representing a tilt angle of bucket 6 with respect to boom 14 by detecting an angle of bell crank 18 (bell crank angle) with respect to boom 14. Second angle detector 48 outputs a detection signal representing a bucket angle to first processor 30. The bucket angle is, for example, an angle formed between straight line LB and a straight line that connects the center of bucket pin 17 and a cutting edge 6a of bucket 6 to each other. A stroke sensor arranged in tilt cylinder 19 may be employed as second angle detector 48.

Pivot mechanism 60 pivotably couples front frame 11 and rear frame 12 to each other. Front frame 11 is pivoted with respect to rear frame 12 by extending and contracting an articulation cylinder coupled between front frame 11 and rear frame 12. By angling (articulating) front frame 11 with respect to rear frame 12, a radius of revolution in revolution of the wheel loader can be made smaller and a ditch digging work or a grading work by offset running can be done. Pivot mechanism 60 is provided with an articulation angle sensor 61. Articulation angle sensor 61 detects an articulation angle. Articulation angle sensor 61 outputs a detection signal representing the articulation angle to first processor 30.

Position detection sensor 64 outputs a detection signal representing a position of wheel loader 1 to first processor 30. IMU 66 outputs a detection signal representing an angle of inclination of wheel loader 1 to first processor 30.

As shown in FIG. 2, wheel loader 1 includes in cab 5, an operation apparatus operated by an operator. The operation apparatus includes a forward and rearward travel switching apparatus 49, an accelerator operation apparatus 51, a boom operation apparatus 52, a shift change operation apparatus 53, a bucket operation apparatus 54, and a brake operation apparatus 58.

Forward and rearward travel switching apparatus 49 includes a forward and rearward travel switching operation member 49a and a forward and rearward travel switching detection sensor 49b. Forward and rearward travel switching operation member 49a is operated by an operator for indicating switching between forward travel and rearward travel of the vehicle. Forward and rearward travel switching operation member 49a can be switched to a position of each of forward travel (F), neutral (N), and rearward travel (R). Forward and rearward travel switching detection sensor 49b detects a position of forward and rearward travel switching operation member 49a. Forward and rearward travel switching detection sensor 49b outputs to first processor 30, a detection signal (forward travel, neutral, or rearward travel) representing a command to travel forward or rearward indicated by a position of forward and rearward travel switching operation member 49a. Forward and rearward travel switching apparatus 49 includes an FNR switch lever capable of switching among forward travel (F), neutral (N), and rearward travel (R).

Accelerator operation apparatus 51 includes an accelerator operation member 51a and an accelerator operation detection unit 51b. Accelerator operation member 51a is operated by an operator for setting a target rotation speed of engine 20. Accelerator operation detection unit 51b detects an amount of operation onto accelerator operation member 51a (an amount of accelerator operation). Accelerator operation detection unit 51b outputs a detection signal representing an amount of accelerator operation to first processor 30.

Brake operation apparatus 58 includes a brake operation member 58a and a brake operation detection unit 58b. Brake operation member 58a is operated by an operator for controlling deceleration force of wheel loader 1. Brake operation detection unit 58b detects an amount of operation onto brake operation member 58a (an amount of brake operation). Brake operation detection unit 58b outputs a detection signal representing an amount of brake operation to first processor 30. A pressure of brake oil may be used as an amount of brake operation.

Boom operation apparatus 52 includes a boom operation member 52a and a boom operation detection unit 52b. Boom operation member 52a is operated by an operator for raising or lowering boom 14. Boom operation detection unit 52b detects a position of boom operation member 52a. Boom operation detection unit 52b outputs to first processor 30, a detection signal representing a command to raise or lower boom 14 indicated by the position of boom operation member 52a.

Shift change operation apparatus 53 includes a shift change operation member 53a and a shift change operation detection unit 53b. Shift change operation member 53a is operated by an operator for controlling shift change from input shaft 21 to output shaft 23a in motive power transmission mechanism 23. Shift change operation detection unit 53b detects a position of shift change operation member 53a. Shift change operation detection unit 53b outputs a shift change detection command indicated by the position of shift change operation member 53a to first processor 30.

Bucket operation apparatus 54 includes a bucket operation member 54a and a bucket operation detection unit 54b. Bucket operation member 54a is operated by an operator for causing bucket 6 to carry out an excavation motion or a dumping motion. Bucket operation detection unit 54b detects a position of bucket operation member 54a. Bucket operation detection unit 54b outputs to first processor 30, a detection signal representing a motion command in a tilt-back direction or a dump direction of bucket 6 indicated by a position of bucket operation member 54a.

Articulation operation apparatus 55 includes an articulation operation member 55a and an articulation operation detection unit 55b. Articulation operation member 55a is operated by an operator for angling (articulating) front frame 11 with respect to rear frame 12 with pivot mechanism 60 being interposed. Articulation operation detection unit 55b detects a position of articulation operation member 55a. Articulation operation detection unit 55b outputs to first processor 30, a detection signal representing a left angling command or a right angling command indicated by a position of articulation operation member 55a.

First processor 30 is implemented by a microcomputer including a storage such as a random access memory (RAM) or a read only memory (ROM) and a computing device such as a central processing unit (CPU). First processor 30 may be implemented as some of functions of a controller of wheel loader 1 that controls motions of engine 20, work implement 3 (boom cylinder 16, tilt cylinder 19, and the like), and motive power transmission mechanism 23. A signal representing a forward and rearward travel command detected by forward and rearward travel switching apparatus 49, a signal representing a vehicle speed of wheel loader 1 detected by vehicle speed detection unit 27, a signal representing a boom angle detected by first angle detector 29, a signal representing a head pressure of boom cylinder 16 detected by pressure sensor 28a, and a signal representing a bottom pressure of boom cylinder 16 detected by pressure sensor 28b are mainly input to first processor 30.

Wheel loader 1 further includes a display 40 and an output unit 45. Display 40 is implemented by a monitor arranged in cab 5 and viewed by an operator.

Output unit 45 outputs work machine motion information including motion information of wheel loader 1 to a server (a second processor 70) provided outside wheel loader 1. Output unit 45 may output work machine motion information including motion information of wheel loader 1 every prescribed period or may collectively output work machine motion information over a plurality of periods.

Output unit 45 may have a communication function such as wireless communication and may communicate with second processor 70. Alternatively, output unit 45 may be implemented, for example, by an interface of a portable storage (such as a memory card) that can be accessed from second processor 70. Second processor 70 includes a display that performs a monitor function and can show a motion image based on work machine motion information output from output unit 45.

[Work Step of Wheel Loader 1 and Distinction Thereof]

Wheel loader 1 in the present embodiment performs an excavation motion for scooping an excavated object such as soil in bucket 6 and a loading motion for loading objects (an excavated object 100) in bucket 6 onto a transportation machine such as a dump truck 110.

Figure 3:
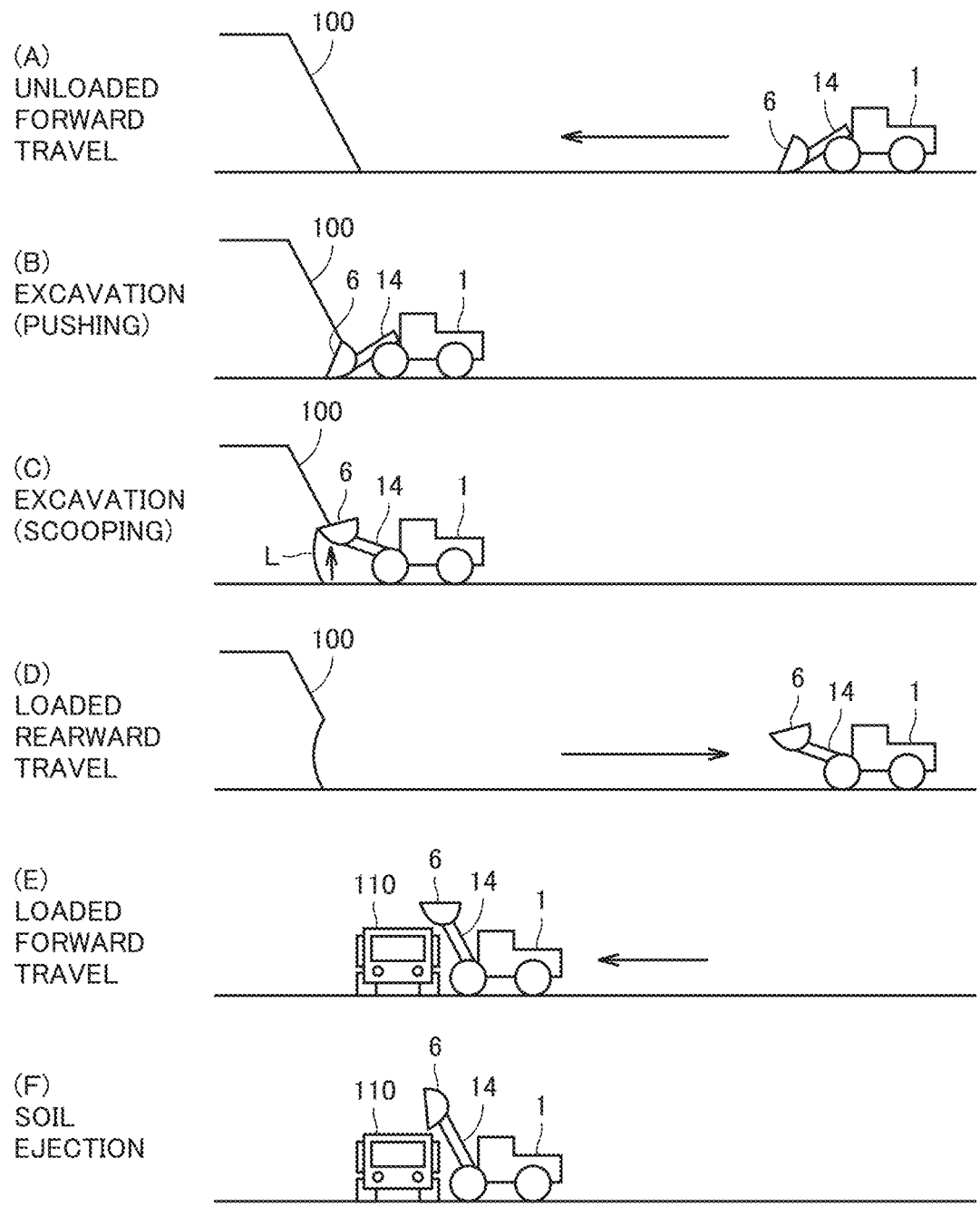
FIG. 3 is a schematic diagram illustrating a work step of wheel loader 1 based on the embodiment.

FIG. 3 is a schematic diagram illustrating a work step of wheel loader 1 based on the embodiment. Wheel loader 1 excavates excavated object 100 and loads excavated object 100 on a transportation machine such as dump truck 110 by successively repeating a plurality of steps as follows.

As shown in FIG. 3 (A), wheel loader 1 travels forward toward excavated object 100. In this unloaded forward travel step, an operator operates boom cylinder 16 and tilt cylinder 19 to set work implement 3 to an excavation attitude in which the tip end of boom 14 is located at a low position and bucket 6 is horizontally oriented, and moves wheel loader 1 forward toward excavated object 100.

As shown in FIG. 3 (B), the operator moves wheel loader 1 forward until cutting edge 6a of bucket 6 is pushed into excavated object 100. In this excavation (pushing) step, cutting edge 6a of bucket 6 is pushed into excavated object 100.

As shown in FIG. 3 (C), the operator thereafter operates boom cylinder 16 to raise bucket 6 and operates tilt cylinder 19 to tilt back bucket 6. In this excavation (scooping) step, bucket 6 is raised along a bucket track L as shown with a curved arrow in the figure and excavated object 100 is scooped into bucket 6. An excavation work for scooping excavated object 100 is thus performed.

Depending on a type of excavated object 100, the scooping step may be completed simply by tilting back bucket 6 once. Alternatively, in the scooping step, a motion to tilt back bucket 6, set the bucket to a neutral position, and tilt back the bucket again may be repeated.

As shown in FIG. 3 (D), after excavated object 100 is scooped into bucket 6, the operator moves wheel loader 1 rearward in a loaded rearward travel step. The operator may raise the boom while moving the vehicle rearward, or may raise the boom while moving the vehicle forward in FIG. 3 (E).

As shown in FIG. 3 (E), the operator moves wheel loader 1 forward to be closer to dump truck 110 while keeping bucket 6 raised or raising bucket 6. As a result of this loaded forward travel step, bucket 6 is located substantially directly above a box of dump truck 110.

As shown in FIG. 3 (F), the operator dumps the excavated object from bucket 6 at a prescribed position and loads objects (excavated object) in bucket 6 on the box of dump truck 110. This step is what is called a soil ejection step. Thereafter, the operator lowers boom 14 and returns bucket 6 to the excavation attitude while the operator moves wheel loader 1 rearward. The above is typical steps defining one cycle of the excavation and loading work.

Figure 4:
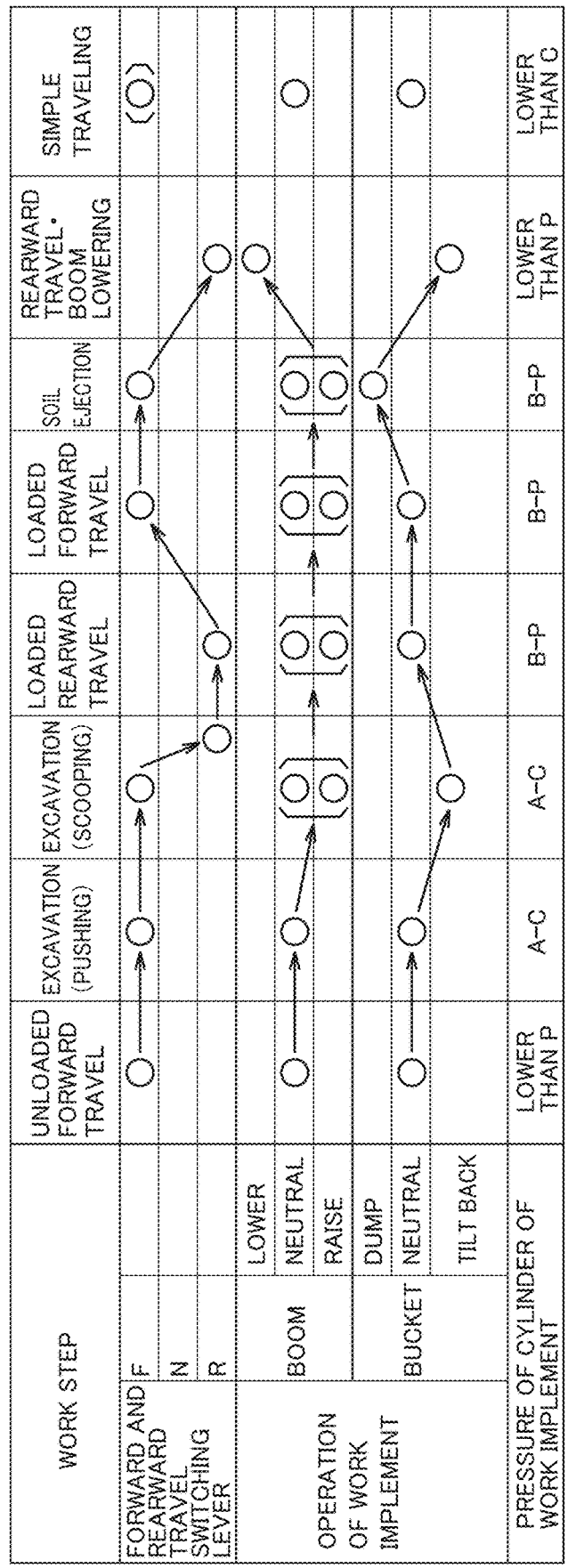
FIG. 4 shows a table showing a method of distinguishing a work step of wheel loader 1 based on the embodiment.

FIG. 4 shows a table showing a method of distinguishing a work step of wheel loader 1 based on the embodiment. In the table shown in FIG. 4, a row of "work step" at the top lists names of work steps shown in FIG. 3 (A) to (F). In rows of "forward and rearward travel switching lever," "operation of work implement," and "pressure of cylinder of work implement" below, various criteria used by first processor 30 (FIGS. 2 and 3) for determining under which step a current work step falls are shown. More specifically, in the row of "forward and rearward travel switching lever," criteria for a forward and rearward travel switching lever are shown with a circle.

In the row of "operation of work implement," criteria for an operation by an operator onto work implement 3 are shown with a circle. More specifically, in a row of "boom", criteria for an operation onto boom 14 are shown, and in a row of "bucket", criteria for an operation onto bucket 6 are shown.

In the row of "pressure of cylinder of work implement," criteria for a current hydraulic pressure of the cylinder of work implement 3 such as a hydraulic pressure of a cylinder bottom chamber of boom cylinder 16 are shown. Four reference values A, B, C, and P are set in advance for a hydraulic pressure, a plurality of pressure ranges (a range lower than reference value P, a range of reference values A to C, a range of reference values B to P, and a range lower than reference value C) are defined by reference values A, B, C, and P, and these pressure ranges are set as the criteria. Magnitude of four reference values A, B, C, and P is defined as A>B>C>P.

By using a combination of criteria for "forward and rearward travel switching lever," "boom", "bucket", and "pressure of cylinder of work implement" for each work step as above, first processor 30 can distinguish a currently performed step.

A specific operation of first processor 30 when control shown in FIG. 4 is carried out will be described below. A combination of criteria for "forward and rearward travel switching lever," "boom", "bucket", and "pressure of cylinder of work implement" corresponding to each work step shown in FIG. 4 is stored in advance in a storage 30j (FIG. 2). First processor 30 recognizes a currently selected forward and rearward travel switching lever (F, N, or R) based on a signal from forward and rearward travel switching apparatus 49. First processor 30 recognizes a type of a current operation onto boom 14 (lowering, neutral, or raising) based on a signal from boom operation detection unit 52b. First processor 30 recognizes a type of a current operation onto bucket 6 (dump, neutral, or tilt back) based on a signal from bucket operation detection unit 54b. First processor 30 recognizes a current hydraulic pressure of the cylinder bottom chamber of boom cylinder 16 based on a signal from pressure sensor 28b shown in FIG. 2.

First processor 30 compares combination of the recognized forward and rearward travel switching lever, the type of the operation onto the boom, the type of the operation onto the bucket, and the hydraulic pressure of the lift cylinder at the current time point (that is, a current state of work) with combination of criteria for "forward and rearward travel switching lever," "boom", "bucket", and "pressure of cylinder of work implement" corresponding to each work step stored in advance. As a result of this comparison processing, first processor 30 determines to which work step the combination of criteria which matches best with the current state of work corresponds. The combination of criteria corresponding to the excavation and loading motion shown in FIG. 4 is as follows by way of example.

In the unloaded forward travel step, the forward and rearward travel switching lever is set to F, the operation of the boom and the operation of the bucket are both set to neutral, and the pressure of the cylinder of the work implement is lower than reference value P. In the excavation (pushing) step, the forward and rearward travel switching lever is set to F, the operation of the boom and the operation of the bucket are both neutral, and the pressure of the cylinder of the work implement is within the range of reference values A to C. In the excavation (scooping) step, the forward and rearward travel switching lever is set to F or R, the operation of the boom is raising or neutral, the operation of the bucket is tilt back, and the pressure of the cylinder of the work implement is within the range of reference values A to C. For an operation of the bucket, such a criterion that tilt back and neutral are alternately repeated may further be added because, depending on a state of an excavated object, a motion to tilt back bucket 6, set the bucket to a neutral position, and tilt back the bucket again may be repeated. In the loaded rearward travel step, the forward and rearward travel switching lever is set to R, the operation of the boom is neutral or raising, the operation of the bucket is neutral, and the pressure of the cylinder of the work implement is within the range of reference values B to P. In the loaded forward travel step, the forward and rearward travel switching lever is set to F, the operation of the boom is raising or neutral, the operation of the bucket is neutral, and the pressure of the cylinder of the work implement is within the range of reference values B to P. In the soil ejection step, the forward and rearward travel switching lever is set to F, the operation of the boom is raising or neutral, the operation of the bucket is dump, and the pressure of the cylinder of the work implement is within the range of reference values B to P. In the rearward travel-boom lowering step, the forward and rearward travel switching lever is set to R, the operation of the boom is lowering, the operation of the bucket is tilt back, and the pressure of the cylinder of the work implement is lower than reference value P.

Information on the work step determined by first processor 30 is output as a part of work machine motion information to second processor 70 through output unit 45. Though a scheme for determination of a work step by first processor 30 is described in the present example, the work step may be determined by second processor 70 without particularly being limited as such.

[Functional Configuration of Second Processor 70]

Figure 5:
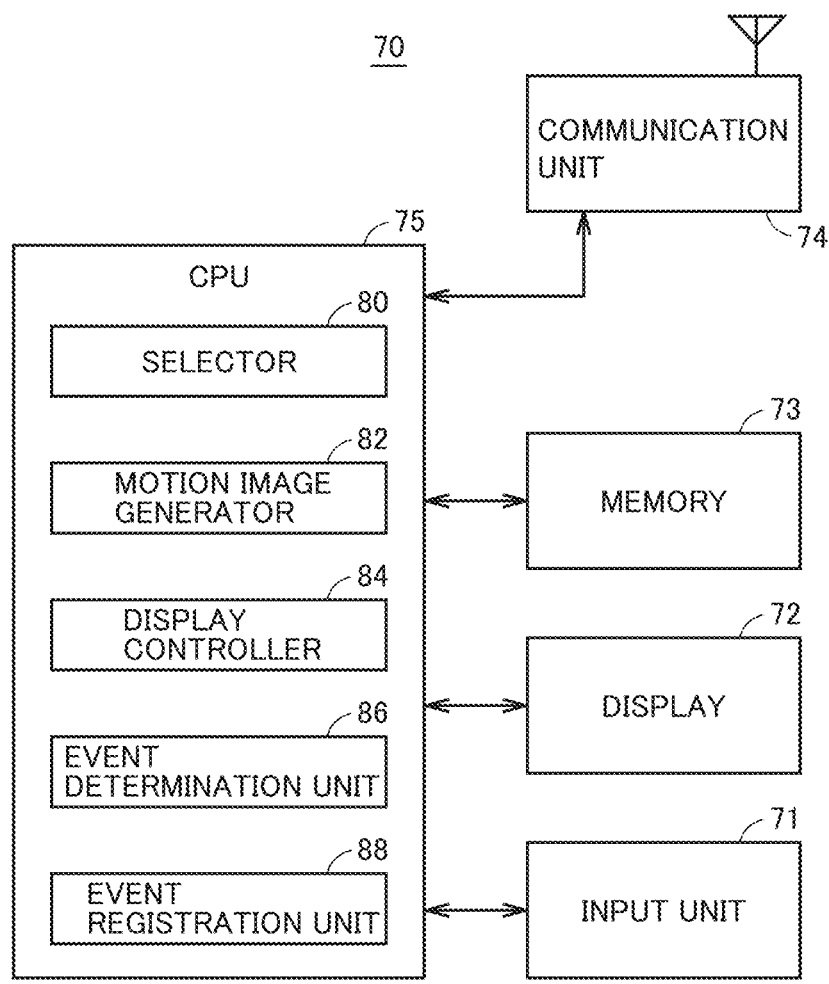
FIG. 5 is a diagram illustrating a functional block of a second processor 70 according to the embodiment.

FIG. 5 is a diagram illustrating a functional block of second processor 70 according to the embodiment. Referring to FIG. 5, second processor 70 includes an input unit 71, a display 72, a memory 73, a communication unit 74, and a CPU 75.

Input unit 71 includes a mouse, a keyboard, a controller, a touch panel, and the like. An input command is generated by operating input unit 71. For example, an input command is generated by operating a mouse, operating a keyboard, operating a button on the controller, or performing a touching operation onto the touch panel.

Display 72 includes a display of liquid crystals or the like. Memory 73 includes a storage such as a RAM or a ROM. Memory 73 stores a program for implementing functional blocks that performs various types of processing as the program is read by CPU 75. Memory 73 stores as work machine motion data, work machine motion information transmitted from wheel loader 1.

Second processor 70 according to the embodiment performs processing for replaying a motion state of wheel loader 1 based on work machine motion data stored in memory 73. Work machine motion data will be described later. Replay processing includes both of processing of a still image at one certain time point and processing of moving images that continuously change over time.

CPU 75 implements various functional blocks based on a program stored in memory 73. Specifically, CPU 75 includes a selector 80, a motion image generator 82, a display controller 84, an event determination unit 86, and an event registration unit 88.

Selector 80 selects as time of replay, time in work machine motion data stored in memory 73. Motion image generator 82 generates motion image data of wheel loader 1 based on work machine motion data in accordance with the time of replay selected by selector 80. Display controller 84 outputs to display 72, a replay screen including a motion image based on the motion image data of wheel loader 1 generated by motion image generator 82 and controls display 72 to show the replay screen. Event determination unit 86 determines whether or not an event has occurred based on the work machine motion information stored in memory 73. Event registration unit 88 has memory 73 register therein in association with the work machine motion information, event information on the event determined as having occurred by event determination unit 86. Second processor 70 corresponds to an exemplary "display system of a work machine" according to the present invention. Selector 80, motion image generator 82, event determination unit 86, event registration unit 88, display 72, and memory 73 correspond to an exemplary "selector", an exemplary "motion image generator," an exemplary "event determination unit," an exemplary "event registration unit," an exemplary "display", and an exemplary "storage" according to the present invention, respectively.

FIG. 6 is a diagram illustrating a work machine table stored in memory 73 according to the embodiment. Referring to FIG. 6, the work machine table includes work machine motion data arranged in a time-series manner.

By way of example, a plurality of pieces of work machine motion data are stored in the work machine table. Specifically, pieces of work machine motion data corresponding to time points "12:01:01", "12:01:05", "12:01:10", "12:02:00", and "12:02:04" on a time line are shown. By way of example, the time corresponds to time of reception by communication unit 74 of second processor 70, of data (work machine motion information) transmitted from output unit 45 of first processor 30. The time is not limited to time of reception of the information by communication unit 74 of second processor 70 but may be time of transmission by output unit 45 of first processor 30 or another reference time.

Work machine motion data includes work machine motion information and event information associated with the work machine motion information.

Event information is information on an event that is occurring. The event information is set by event registration unit 88, although description will be provided later. Therefore, before setting by event registration unit 88, event information in work machine motion data is blank.

The work machine motion information includes vehicle information CN, operation information T, position information P, an operator ID, and a vehicular body ID that are brought in correspondence with time. Vehicle information CN is information on wheel loader 1. Specifically, vehicle information CN includes information on work implement 3 and information on a vehicle including traveling unit 4 except for work implement 3. Though an example in which vehicle information CN includes information on both of work implement 3 and the vehicle is described in the present example, the vehicle information may include any one of them. Information on work implement 3 includes work implement data relating to detection signals from first angle detector 29, second angle detector 48, and first hydraulic pressure detectors 28a and 28b and a work step. A state of an attitude of work implement 3 can be sensed based on the work implement data.

Information on the vehicle includes vehicle data relating to detection signals from temperature sensor 31, vehicle speed detection unit 27, and articulation angle sensor 61. A state of traveling unit 4 can be sensed based on the vehicle data. Operation information T includes work implement operation information on work implement 3 and vehicle operation information. The work implement operation information includes work implement operation data relating to detection signals from boom operation detection unit 52b and bucket operation detection unit 54b. A state of an operation onto work implement 3 can be sensed based on the work implement operation data. The vehicle operation information includes vehicle operation data relating to detection signals from forward and rearward travel switching operation member 49a, accelerator operation detection unit 51b, shift change operation detection unit 53b, articulation operation detection unit 55b, and brake operation detection unit 58b. A state of an operation onto the vehicle can be sensed based on the vehicle operation data. Though an example in which operation information T includes both of work implement operation information and vehicle operation information is described in the present example, the operation information may include any one of them.

Position information P is information relating to a position of wheel loader 1. Specifically, position information P includes position data relating to a detection signal from position detection sensor 64 and inclination data relating to a detection signal from IMU 66.

The operator ID is information for identification of an operator of wheel loader 1. By way of example, the operator ID is stored in advance in a key used for start-up of the engine of the work machine by the operator. First processor 30 obtains the operator ID from the key at the time when the engine of the work machine is started up.

The vehicular body ID is information for identification of the vehicular body of wheel loader 1. By way of example, the vehicular body ID is stored in advance in storage 30j of first processor 30. Though an example in which the vehicular body ID is stored in storage 30j of first processor 30 is described in the present example, the vehicular body ID may be stored in advance in memory 73 of second processor 70 without being limited as such.

[Event Registration Processing]

Figure 7:
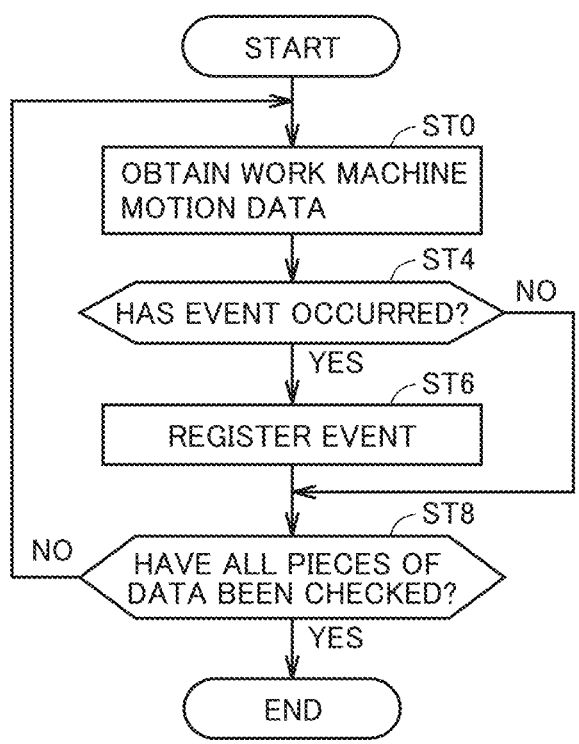
FIG. 7 is a flowchart illustrating event registration processing by second processor 70 according to the embodiment.

FIG. 7 is a flowchart illustrating event registration processing by second processor 70 according to the embodiment. Referring to FIG. 7, event determination unit 86 obtains work machine motion data stored in the work machine table in memory 73 (step ST0).

Then, event determination unit 86 determines whether or not an event has occurred based on the obtained work machine motion data (step ST4). Event determination unit 86 determines whether or not the obtained work machine motion data satisfies a prescribed event condition.

By way of example, regarding an event condition, when a temperature is equal to or higher than a prescribed temperature, an overheat event is determined as having occurred in the present example. For example, information on the vehicle included in vehicle information CN includes vehicle data relating to a detection signal from temperature sensor 31. Event determination unit 86 determines whether or not the temperature is equal to or higher than a prescribed temperature based on data obtained from the detection signal from temperature sensor 31.

Regarding another event condition, in the present example, an event is determined as having occurred based on information on a work step. For example, vehicle information CN includes work implement data including a work step. Event determination unit 86 determines whether or not an event has occurred based on the work implement data. When the work implement data includes information on an excavation work step, an excavation event is determined as having occurred.

Without being limited as such, various event conditions can be provided. A prescribed event may be determined as having occurred based on one piece of data in the obtained work machine motion information or based on combination of a plurality of pieces of data.

When event determination unit 86 determines in step ST4 that an event has occurred (YES in step ST4), it gives a registration instruction to event registration unit 88.

Then, event registration unit 88 has event information registered in accordance with the registration instruction from event determination unit 86 (step ST6).

Then, event registration unit 88 determines whether or not checking of all pieces of work machine motion data included in the work machine table has ended (step ST8).

When event registration unit 88 determines in step ST8 that checking of all pieces of work machine motion data has ended (YES in step ST8), event registration processing ends (end). When event registration unit 88 determines in step ST8 that checking of all pieces of work machine motion data has not ended (NO in step ST8), the process returns to step ST0. The work machine motion data in the work machine table for which checking has not ended is obtained and the processing above is repeated.

When an overheat event has occurred by way of example, event registration unit 88 has the event registered in the work machine motion data, as event information associated with the work machine motion information. When an excavation event has occurred by way of example, event registration unit 88 has the event registered in the work machine motion data, as event information associated with the work machine motion information. This is also applicable to other pieces of work machine motion data. Event information shown in FIG. 6 is thus set.

[Motion Image Generation Processing]

Figure 8:
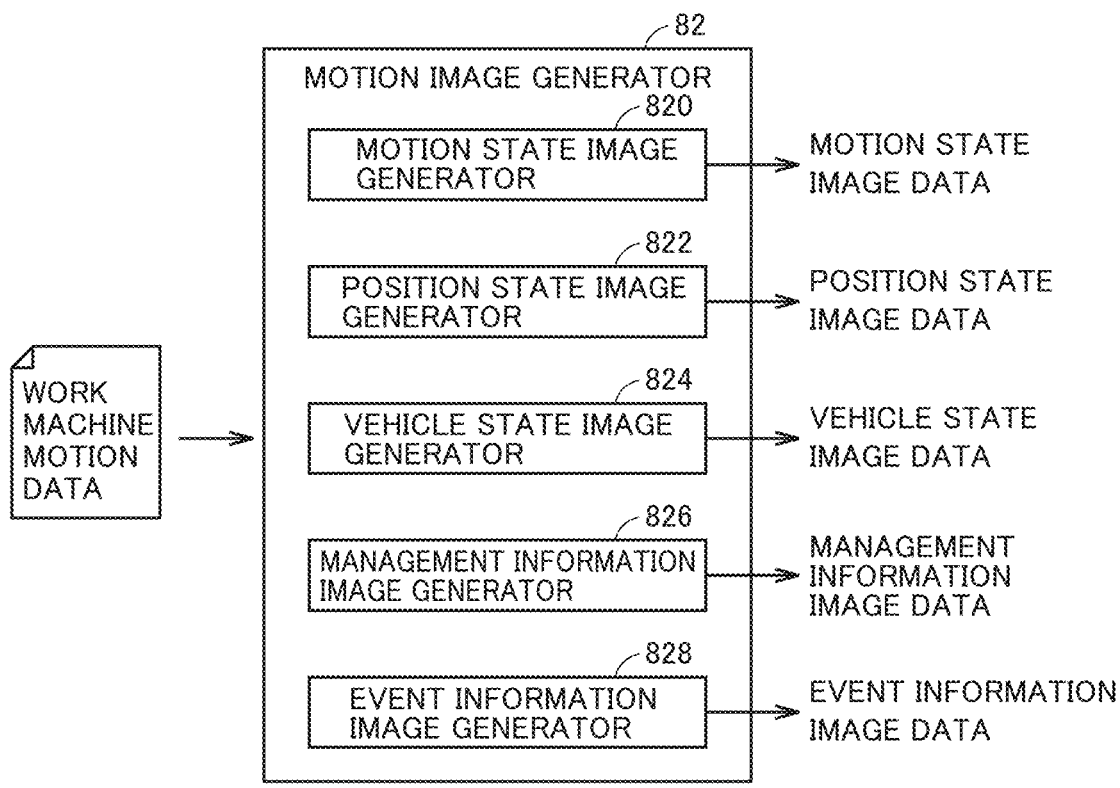
FIG. 8 is a diagram illustrating a detailed functional block of a motion image generator 82 according to the embodiment.

FIG. 8 is a diagram illustrating a detailed functional block of motion image generator 82 according to the embodiment. Referring to FIG. 8, motion image generator 82 includes a motion state image generator 820, a position state image generator 822, a vehicle state image generator 824, a management information image generator 826, and an event information image generator 828. Each functional block of motion image generator 82 is implemented by a program stored in advance in memory 73.

Motion state image generator 820 generates motion state image data based on the work machine motion data. Position state image generator 822 generates position state image data based on the work machine motion data. Vehicle state image generator 824 generates vehicle state image data based on the work machine motion data. Management information image generator 826 generates management information image data based on the work machine motion data. Event information image generator 828 generates event information image data based on the work machine motion data.

Figure 9:
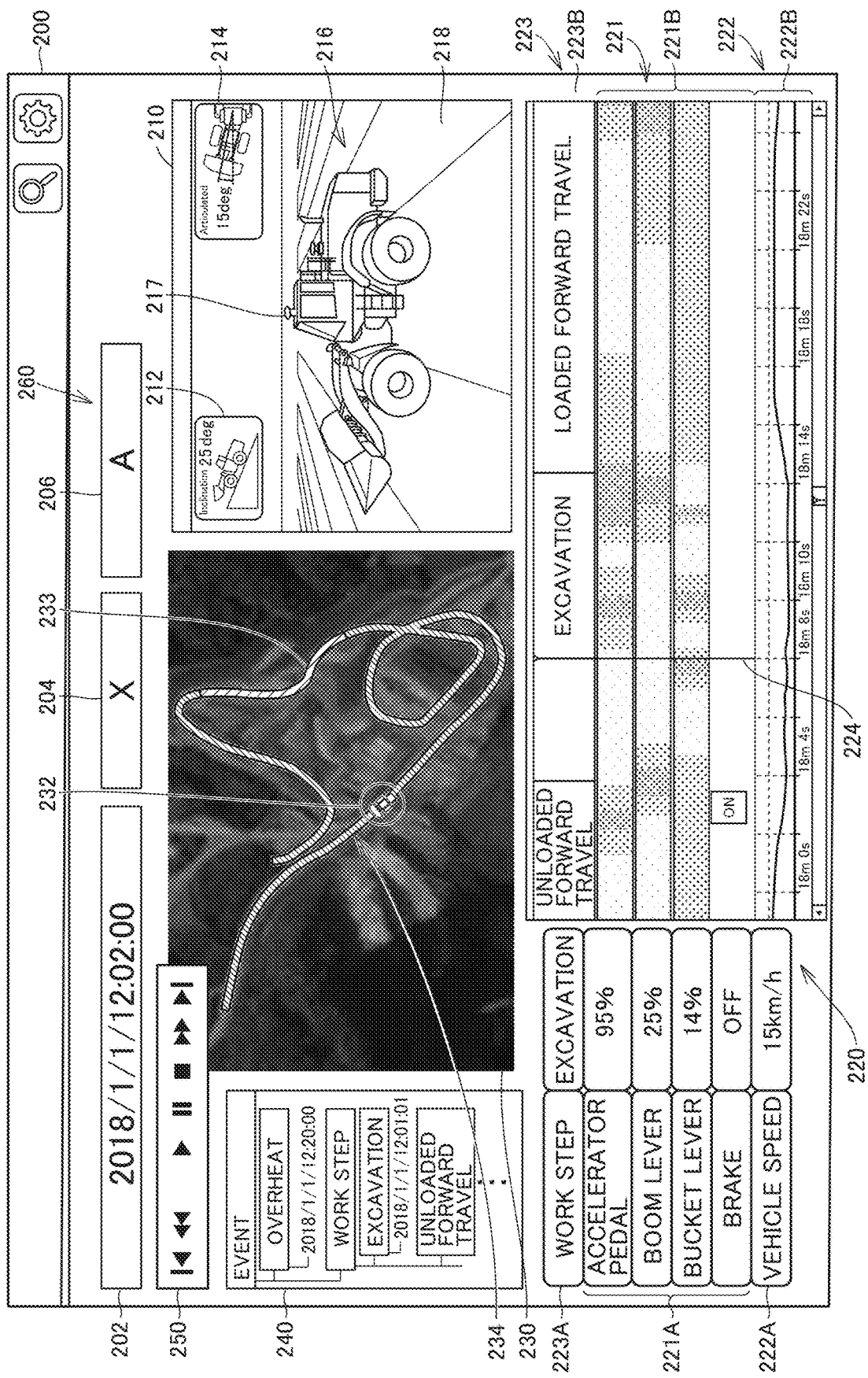
FIG. 9 is a diagram illustrating a replay screen 200 on a display 72 according to the embodiment.

FIG. 9 is a diagram illustrating a replay screen 200 on display 72 according to the embodiment. Referring to FIG. 9, replay screen 200 is provided with a plurality of screens where various types of information on wheel loader 1 corresponding to a certain time of replay (time of a work "2018 Jan. 1/12:02:00") of wheel loader 1 are shown. The plurality of screens are in synchronization with the time of the work. In the present example, motion image generator 82 generates motion image data of wheel loader 1 based on the work machine motion data corresponding to a certain time of replay (the time of the work) stored in the work machine table. The time of replay may be information only on time or may include information on a date.

Display controller 84 controls display 72 to show replay screen 200 based on the motion image data generated by motion image generator 82. In the present example, motion image data includes motion state image data, position state image data, vehicle state image data, management information image data, and event information image data.

Specifically, display controller 84 controls display 72 to show a motion screen 210 where movement of wheel loader 1 is shown, based on the motion state image data. Display controller 84 controls display 72 to show a position screen 230 where wheel loader 1 is shown, based on the position state image data. Display controller 84 controls display 72 to show a state screen 220 where information on a state of wheel loader 1 is shown, based on the vehicle state image data. Display controller 84 controls display 72 to show an event display screen 240 where a list of events that have occurred in wheel loader 1 is shown, based on the event information image data. Display controller 84 controls display 72 to show a management screen 260 where management information of wheel loader 1 is shown, based on the management information image data. Display controller 84 provides a command bar 250 for giving various commands relating to replay processing to replay screen 200.

Command bar 250 includes a play button, a stop button, a pause button, a fast forward button, and a fast reverse button. As a manager operates the button, various types of processing relating to replay processing can be performed. As the manager operates the play button, processing for continuously replaying motion images of wheel loader 1 (moving image replay processing) that change over time from a certain time of replay is performed. As the manager operates the pause button, processing for replaying a motion image of wheel loader in accordance with a certain time of replay (still image replay processing) is performed.

[Motion Screen 210]

Motion screen 210 is shown based on the motion state image data. Motion screen 210 includes an inclined state image 212, an articulated state image 214, and a work state image 216.

Motion state image generator 820 generates first motion state image data based on 3D model geometrical data for generating a reference image of a 3D model geometry of wheel loader 1 and work implement data included in vehicle information CN. The 3D model geometrical data is stored in advance in memory 73. The 3D model geometrical data includes data on a model geometry of each of the work implement, the vehicular body, and the wheel that composes a reference image of the 3D model geometry. The first motion state image data may be image data representing an inclination or an articulation angle of the vehicle.

Display controller 84 has work state image 216 shown based on the first motion state image data, the work state image showing a state of works by wheel loader 1. Work state image 216 includes a work implement model image 217 showing a 3D model of wheel loader 1 and a road surface image 218 that shows a road surface model on which wheel loader 1 runs.

Display controller 84 can allow expression of a state of running in work implement model image 217 and road surface image 218 as being combined. Specifically, by way of example, forward movement of work implement model image 217 can be expressed by sliding road surface image 218 from the left to the right without change in position of work implement model image 217. Display controller 84 may express a degree of a state of running in work implement model image 217 by adjusting a moving speed of road surface image 218. For example, display controller 84 may provide such an expression that work implement model image 217 moves forward at a high speed by increasing a speed of sliding road surface image 218. In contrast, display controller 84 may provide such an expression that work implement model image 217 moves forward at a low speed by lowering a speed of sliding road surface image 218. Display controller 84 may adjust the speed of sliding road surface image 218 based on vehicle speed data included in vehicle information CN. Display controller 84 has work implement model image 217 shown based on time-series first motion state image data. Time-series states of works by wheel loader 1 can thus be reproduced. A field of view can also be changed by accepting setting of a direction of the field of view of a virtual camera in reproduction of the states of works.

Motion state image generator 820 generates second motion state image data based on side surface geometrical model data for generating a reference image of a geometry of a side surface model of wheel loader 1 and inclination data included in position information P. Display controller 84 has inclined state image 212 shown based on the second motion state image data. Inclined state image 212 shows a state of inclination of the vehicular body of wheel loader 1. In the present example, exemplary inclination by 25° is shown. Display controller 84 has inclined state image 212 shown based on the time-series second motion state image data. Time-series states of inclination of the vehicular body of wheel loader 1 can thus be reproduced.

Motion state image generator 820 generates third motion state image data based on top-view geometrical model data for generating a reference image of a geometry of a top view model of wheel loader 1 and articulation angle data included in vehicle information CN. Display controller 84 has an articulated state image 214 shown based on the third motion state image data. Articulated state image 214 shows a state of articulation of wheel loader 1. In the present example, a state of right angling by 15° is shown. Display controller 84 has articulated state image 214 shown based on the time-series third motion state image data. Time-series articulated states of wheel loader 1 can thus be reproduced.

[State Screen 220]

State screen 220 is shown based on vehicle state image data. State screen 220 includes a time bar 224 that indicates designated time, an operation state image 221, a vehicle state image 222, and a work step state image 223. Time bar 224 indicates certain time of work. Time bar 224 in the present example is provided as being movable to a position corresponding to any time of work.

Vehicle state image generator 824 generates first vehicle state image data based on operation information T in work machine motion data over a prescribed period. Display controller 84 has operation state image 221 shown based on the first vehicle state image data, the operation state image showing a state over a prescribed period of the operation member operated by an operator. Operation state image 221 includes a designated operation state image 221A corresponding to certain time of work and an operation transition state image 221B showing a state of transition of operations over the prescribed period. Designated operation state image 221A shows a state of accelerator operation apparatus 51 (an accelerator pedal), boom operation apparatus 52 (a boom lever), bucket operation apparatus 54 (a bucket lever), and brake operation apparatus 58 (a brake). In the present example, 95% for the accelerator pedal, 25% for the boom lever, 14% for the bucket lever, and a brake OFF state are shown. Operation transition state image 221B shows a state of transition of operations onto accelerator operation apparatus 51 (accelerator pedal), boom operation apparatus 52 (boom lever), bucket operation apparatus 54 (bucket lever), and brake operation apparatus 58 (brake) over the prescribed period (26s in the present example).

An operation state is shown in a grayscale for accelerator operation apparatus 51 (accelerator pedal), boom operation apparatus 52 (boom lever), and bucket operation apparatus 54 (bucket lever). Specifically, a value of a ratio of operations onto the operation member is larger, the color is denser (blacker), and as a numeric value is smaller, the color is lighter (whiter). Though an example where an operation state is expressed with the grayscale is described in the present example, the operation state may be shown with a heat map. For example, by changing a color at the time when boom operation apparatus 52 (boom lever) is operated to perform a raising motion or a lowering motion, which operation is being performed can visually intuitively be known. This is also applicable to bucket operation apparatus 54 (bucket lever). A value of an amount of operations onto an operation member may be shown in a graph. For brake operation apparatus 58 (brake), a brake ON state or a brake OFF state is shown. What kind of operation has been performed on an operation member for a prescribed period can thus readily be known.

Vehicle state image generator 824 generates second vehicle state image data based on vehicle information CN in work machine motion data over a prescribed period. Display controller 84 has vehicle state image 222 and work step state image 223 shown based on the second vehicle state image data, the vehicle state image and the work step state image showing a state of wheel loader 1 over the prescribed period. Vehicle state image 222 includes a designated vehicle state image 222A corresponding to certain time of work and a vehicle transition state image 222B showing a state of transition of the vehicle over the prescribed period. In the present example, designated vehicle state image 222A shows an example where a vehicle speed of wheel loader 1 is at 15 km/h.

Vehicle transition state image 222B shows a state of transition of the vehicle speed of wheel loader 1 over the prescribed period (26s in the present example). How the vehicle speed of wheel loader 1 has varied over the prescribed period can readily be known.

Work step state image 223 includes a designated work step state image 223A that shows a work step corresponding to certain time of work and a work step transition state image 223B that shows a state of transition of work steps over the prescribed period. Designated work step state image 223A shows excavation as the work step in the present example. Work step transition state image 223B shows an example in which the work step is varied to unloaded forward travel, excavation, and loaded forward travel during the prescribed period. How the work steps of wheel loader 1 have varied during the prescribed period can thus readily be known.

Display controller 84 controls operation transition state image 221B, vehicle transition state image 222B, and work step transition state image 223B to move from the right to the left in accordance with time of work corresponding to time bar 224 by way of example. Time bar 224 can be moved to a position of any time of work during the prescribed period based on input through input unit 71.

[Position Screen 230]

Position screen 230 is shown based on the position state image data. Position screen 230 includes a work position image 232 and a movement track image 234.

Position state image generator 822 generates position state image data based on map data that shows a work map and position data included in position information P. Display controller 84 has work position image 232 and movement track image 234 shown based on the position state image data, the work position image showing a position of works by wheel loader 1 on the work map, the movement track image showing a track of movement of wheel loader 1. Work position image 232 is provided as being movable in accordance with movement track image 234 that shows a track of movement of wheel loader 1. Display controller 84 has work position image 232 and movement track image 234 shown on the work map based on time-series position state image data. Time-series states of movement of works by wheel loader 1 can thus be reproduced. Movement track image 234 includes a speed change region 233. Speed change region 233 refers to a region where a speed of movement of wheel loader 1 has changed. By providing speed change region 233 in movement track image 234, change in speed of wheel loader 1 can visually be determined. Though one speed change region 233 is shown in the present example, a plurality of regions may be provided without particularly being limited as such. Change in speed is shown by change in hatching pattern by way of example. Without being limited to such representation, change in speed of wheel loader 1 may visually be determined based on a color or another highlighted representation. Work position image 234 can be changed to any position of works along movement track image 234 based on input through input unit 71.

[Event Display Screen 240]

Event display screen 240 is shown based on event information image data. Event display screen 240 includes an event list. Event information image generator 828 generates event information image data based on event information in work machine motion data. Display controller 84 has the event list shown based on the event information image data. In the present example, overheat and a work step are shown as events. Work steps are further subcategorized and steps such as excavation and unloaded forward travel are listed. Time of each event is shown in a tree format.

In the present example, selection from among events shown in the tree format can be made based on an item indicating time of occurrence of that event. For example, by designating an item "2018 Jan. 1/12:20:00" that indicates time of overheat, work machine motion data in the work machine table brought in correspondence with that time is selected. Then, motion image data of wheel loader 1 is generated based on the selected work machine motion data. A state of occurrence of an event of wheel loader 1 can thus readily be reproduced.

[Management Screen 260]

Management screen 260 is shown based on management information image data. Management screen 260 includes a time image 202 that shows time of replay processing, a vehicular body ID image 204, and an operator ID image 206. Management information image generator 826 generates first management information image data based on time information in work machine motion data. Display controller 84 has time image 202 corresponding to time of replay (time of a work) shown based on the first management information image data. In the present example, "2018 Jan. 1:12:02:00" is shown as time image 202.

Management information image generator 826 generates second management information image data based on a vehicular body ID in the work machine motion data.

Display controller 84 has vehicular body ID image 204 shown based on the second management information image data. In the present example, "X" is shown as vehicular body ID image 204.

Management information image generator 826 generates third management information image data based on the operator ID in the work machine motion data. Display controller 84 has operator ID image 206 shown based on the third management information image data. In the present example, "A" is shown as the operator ID image. Display controller 84 has time, the vehicular body ID, and the operator ID shown based on the first to third management information image data. Time-series management information on wheel loader 1 can thus readily be reproduced.

[Replay Position Selection Processing]

Figure 10:
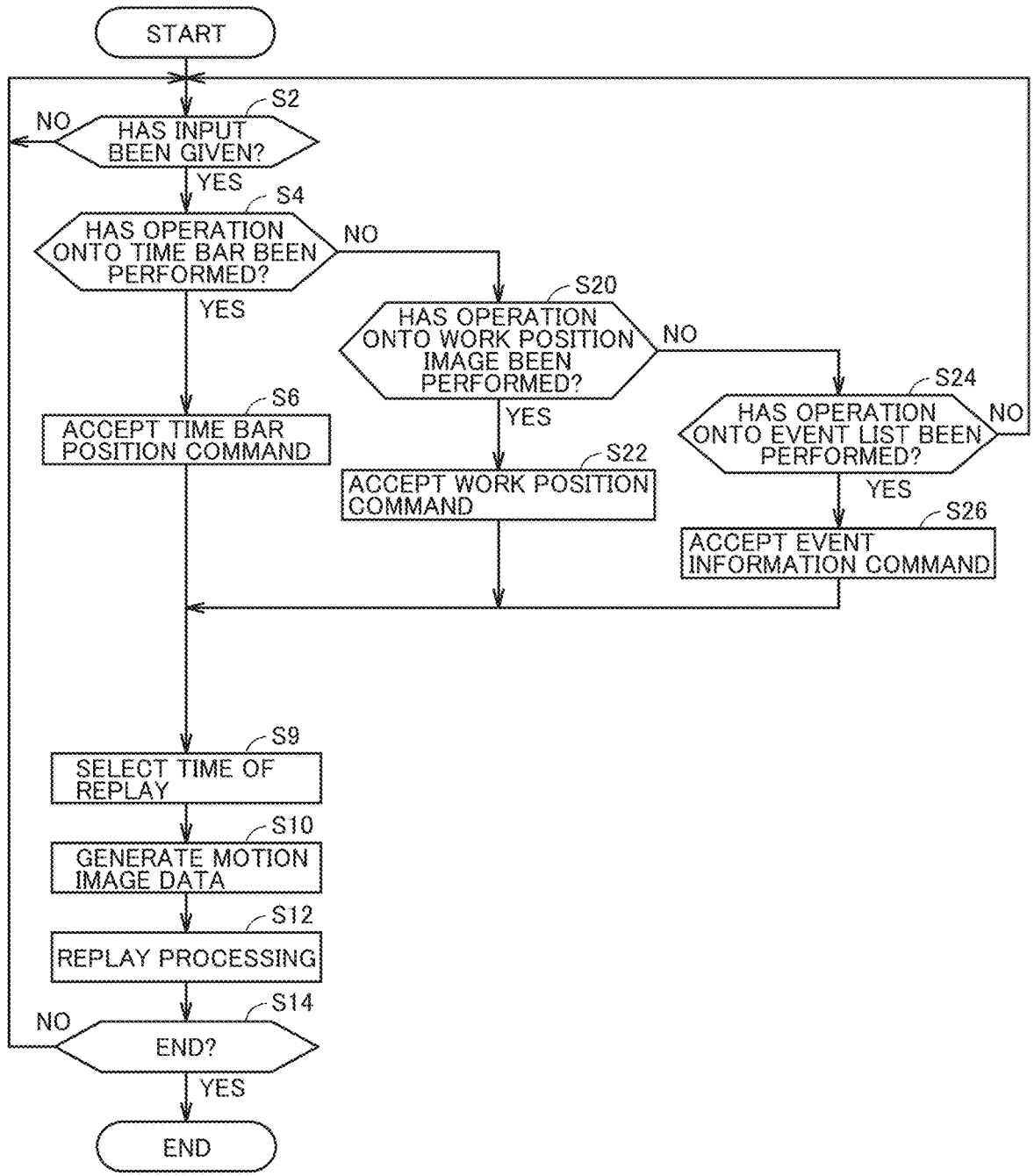
FIG. 10 is a flowchart illustrating replay position selection processing by second processor 70 according to the embodiment.

In the embodiment, a manager can select a position to replay a motion image of wheel loader 1. FIG. 10 is a flowchart illustrating replay position selection processing by second processor 70 according to the embodiment. Referring to FIG. 10, selector 80 determines whether or not it has accepted input from input unit 71 (step S2). When selector 80 has not accepted input from input unit 71, it maintains a state in step S2.

When selector 80 determines that it has accepted input from input unit 71 (YES in step S2), it determines whether or not the input is operation input onto time bar 224 (step S4). When selector 80 determines that the input is not the operation input onto time bar 224 (NO in step S4), the process proceeds to step S20.

When selector 80 determines that the input is operation input onto time bar 224 (YES in step S4), it accepts a command to select a position of time bar 224 (step S6). For example, a position of end of an operation through input unit 71 is accepted as the command to select a position of time bar 224.

Then, selector 80 selects time of work corresponding to the position of time bar 224 as time of replay (step S9). Then, motion image generator 82 generates motion image data of wheel loader 1 based on work machine motion data, in accordance with the time of replay selected by selector 80 (step S10).

Then, display controller 84 performs replay processing based on the motion image data of wheel loader 1 generated by motion image generator 82 (step S12). Specifically, as described with reference to FIG. 8, display controller 84 outputs a replay screen including a motion image to display 72 and controls the display to show the replay screen. By selecting a position of time bar 224, the manager can perform processing for replaying the motion image at the replay position corresponding to an arbitrary position of time bar 224.

Then, display controller 84 determines whether or not replay processing has ended (step S14). When display controller 84 determines that replay has not ended (NO in step S14), the process returns to step S2 and the processing above is repeated.

When display controller 84 determines that replay processing has ended (YES in step S14), the process ends. When selector 80 determines in step S20 that an operation onto time bar 224 has not been performed, it determines whether or not an operation onto work position image 232 has been performed. When selector 80 determines that an operation onto work position image 232 has not been performed (NO in step S20), the process proceeds to step S24.

When selector 80 determines that an operation onto work position image 232 has been performed (YES in step S20), it accepts a command to select a work position (step S22). For example, a position of end of an operation using input unit 71 is accepted as a command to select a position of work position image 232. Work position image 232 is provided as being movable as following a track in movement track image 234.

Then, selector 80 selects time of work corresponding to the position of work position image 232 as time of replay (step S9). Since subsequent processing is similar to the above, detailed description thereof will not be repeated.

The manager can perform processing for replaying a motion image at a replay position corresponding to an arbitrary position of work position image 232 by selecting the position of work position image 232. When selector 80 determines that an operation onto work position image 232 has not been performed, it determines whether or not an operation onto an event list has been performed.

When selector 80 determines that an operation onto the event list has not been performed (NO in step S24), the process returns to step S2. When selector 80 determines that an operation onto the event list has been performed (YES in step S24), it accepts a command to select event information (step S26). For example, a command to select event information designated by an operation onto input unit 71 is accepted. For example, input to select time corresponding to excavation or overheat is accepted.

Then, selector 80 selects time of acceptance of selection input as time of replay (step S9). Since subsequent processing is similar to the above, detailed description thereof will not be repeated. The manager can perform processing for replaying a motion image at a replay position corresponding to an arbitrary position of an event by performing an operation onto the event list.

[Form of Use]

Replay screen 200 is shown as a result of replay processing by second processor 70 according to the embodiment. Replay screen 200 shows motion screen 210, state screen 220, and position screen 230 generated based on work machine motion data corresponding to certain time of work by way of example.

In motion screen 210, by way of example, work state image 216 showing a state of works by wheel loader 1 is shown. In state screen 220, by way of example, operation state image 221 is shown. In position screen 230, work position image 232 showing a position of works by wheel loader 1 on a work map is shown. The manager can readily know on the screens, when, where, and what kind of work an operator of wheel loader 1 has done.

Since the manager can arbitrarily select a position to replay a motion image of wheel loader 1, for example, the manager can make effective use of the same in training driving by an operator. The manager can provide appropriate training relating to a state of an operation by an operator by checking, for example, operation state image 221 on state screen 220. By checking the event list, it can also be made use of for trouble shooting or investigation of complaints.

OTHER EMBODIMENTS

Though an example in which the work machine table is stored in memory 73 of second processor 70 is described in the embodiment, it may be stored, for example, in storage 30j of first processor 30 without particularly being limited as such. Replay processing may be performed based on the work machine table stored in storage 30j of first processor 30.

Though a configuration in which various functional blocks are implemented by CPU 75 of second processor 70 is described in the embodiment, some or all of the functional blocks may be implemented by first processor 30 without being limited as such.

Though an example in which replay screen 200 is shown on display 72 of second processor 70 is described in the embodiment, replay screen 200 may be shown on display 40 of wheel loader 1. Display 40 and first processor 30 of wheel loader 1 may be integrated into one device. Without being limited to wheel loader 1, for example, replay screen 200 may be shown on a display of a portable terminal provided to communicate with second processor 70.

An example in which a plurality of screens in synchronization with time of a work are shown on replay screen 200 is described in the embodiment. Specifically, though an example in which replay screen 200 includes motion screen 210, state screen 220, position screen 230, event display screen 240, and management screen 260 as the plurality of screens is described, all of these screens do not particularly have to be shown, and for example, two or more screens may be shown. For example, motion screen 210 and state screen 220 may be shown on replay screen 200. Combination with another screen can also naturally be made.

Functions and Effects

Functions and effects of the embodiment will now be described. As shown in FIG. 5, the display system of the work machine in the embodiment is provided with memory 73 that stores the work machine table where time-series work machine motion information is stored, motion image generator 82 that generates a motion image of wheel loader 1 based on the work machine motion data stored in the work machine table, and display 72 that shows the motion image. As shown in FIG. 6, in the work machine table, the time-series work machine motion information including the motion information of wheel loader 1 is stored as the work machine motion data. The motion image of wheel loader 1 is generated based on the work machine motion data stored in memory 73 and the motion image is shown on display 72. Therefore, the motion state of wheel loader 1 can be shown.

As shown in FIG. 5, the display system of the work machine in the embodiment is further provided with selector 80 that selects as time of replay, time in the work machine motion data stored in memory 73. Motion image generator 82 generates the motion image of wheel loader 1 based on the work machine motion data, in accordance with the time of replay selected by selector 80. Since time of replay can be selected by means of selector 80, a motion state of wheel loader 1 can be shown at an arbitrary position.

The work machine table where the work machine motion information is stored is provided in storage 30j of first processor 30 within wheel loader 1 or memory 73 of second processor 70. Since the work machine table can be arranged also in another external device without being limited to wheel loader 1, a degree of freedom of the display system of the work machine can be improved.

As shown in FIG. 5, the display system of the work machine in the embodiment is further provided with event determination unit 86 and event registration unit 88. Event determination unit 86 determines whether or not an event has occurred based on the work machine motion information. Event registration unit 88 has the occurred event stored in the work machine table as the work machine motion data, in association with the work machine motion information. Whether or not a prescribed event has occurred in wheel loader 1 can be known.

As shown in FIG. 5, the display system of the work machine in the embodiment is further provided with selector 80 that selects time to replay the work machine motion information in accordance with an event that has occurred. The motion state of wheel loader 1 can be replayed and checked in accordance with the event information stored in the work machine table.

As shown in FIG. 9, event display screen 240 shows a list of events that have occurred. Selector 80 selects time to replay the work machine motion information in accordance with an operation onto the event list. A motion state of wheel loader 1 can be replayed and checked in a simplified manner based on the events that have occurred, in accordance with the event list shown on event display screen 240.

Selector 80 selects time to replay the work machine motion information in accordance with an input command provided through input unit 71 onto replay screen 200 shown in FIG. 9. A motion state of wheel loader 1 can be replayed and checked in a simplified manner by using an input interface of replay screen 200.

Motion image generator 82 is provided in first processor 30 within wheel loader 1 or in second processor 70. Since the motion image generator can be arranged also in another external device without being limited to wheel loader 1, a degree of freedom of the display system of the work machine can be improved.

Display 72 is provided in first processor 30 within wheel loader 1 or in second processor 70. Since the display can be arranged also in another external device without being limited to wheel loader 1, a degree of freedom of the display system of the work machine can be improved.

Wheel loader 1 includes work implement 3 and traveling unit 4. The work machine motion information shown in FIG. 6 includes vehicle information CN, and vehicle information CN includes motion information of at least one of work implement 3 and traveling unit 4. A motion state of at least one of work implement 3 and traveling unit 4 of wheel loader 1 can be replayed and checked.

The work machine motion information shown in FIG. 6 includes operation information T, and operation information T includes operation command information of at least one of work implement 3 and traveling unit 4. A motion state resulting from an operation command, of at least one of work implement 3 and traveling unit 4 of wheel loader 1 can be replayed and checked.

As shown in FIG. 6, the work machine motion information includes position information on a position of wheel loader 1. A position state of wheel loader 1 can be replayed and checked.

As shown in FIG. 6, the work machine motion information further includes identification information for identification of an operator or a vehicular body. When a plurality of operators or a plurality of vehicular bodies are provided, they can readily be distinguished from one another based on the identification information.

As shown in FIG. 9, the work machine is a wheel loader. A motion state of wheel loader 1 can be replayed and checked.

As shown in FIG. 8, motion image generator 82 is provided with motion state image generator 820 that generates a motion image of a motion state of the work machine based on the work machine motion information and vehicle state image generator 824 that generates a motion image of an operation state corresponding to the motion state of the work machine. Therefore, as shown in FIG. 9, an operation state corresponding to the motion state can be replayed and checked together with the motion state of wheel loader 1.

As shown in FIG. 8, motion image generator 82 is provided with motion state image generator 820 that generates a motion image of a motion state of the work machine based on vehicle information CN in the work machine motion information. As shown in FIG. 9, a motion state of wheel loader 1 can be replayed and checked.

As shown in FIG. 8, motion image generator 82 is provided with vehicle state image generator 824 that generates a motion image that shows change over time in operations by the work machine based on operation information T in the work machine motion information. As shown in FIG. 9, an operation state of wheel loader 1 can be replayed and checked.

As shown in FIG. 8, motion image generator 82 is further provided with position state image generator 822 that generates a motion image of the work machine that shows a position of works by the work machine on a work map based on position information P in the work machine motion information. As shown in FIG. 9, a position of works by wheel loader 1 can be replayed and checked.

As shown in FIG. 5, the display system of the work machine in the embodiment is further provided with selector 80 that accepts a command to select a work position through input unit 71 and selects time to replay the work machine motion information. Processing for replaying a motion image of wheel loader 1 corresponding to an arbitrary position of works can be performed.

A method of controlling a display system of a work machine in the embodiment includes storing time-series work machine motion information including motion information of the work machine, generating a motion image of the work machine based on the work machine motion information, and showing the motion image. As shown in FIG. 6, in the work machine table, the time-series work machine motion information including the motion information of wheel loader 1 is stored as the work machine motion data. The motion image of wheel loader 1 is generated based on the work machine motion data stored in memory 73 and the motion image is shown on display 72. Therefore, the motion state of wheel loader 1 can be shown.

Though a wheel loader is described as the work machine by way of example, a work machine such as a hydraulic excavator, a dump truck, or a crawler dozer is also applicable.

Though an embodiment of the present invention has been described above, it should be understood that the embodiment disclosed herein is illustrative and non-restrictive in every respect. The scope of the present invention is defined by the terms of the claims and is intended to include any modifications within the scope and meaning equivalent to the terms of the claims.

REFERENCE SIGNS LIST

1 wheel loader; 2 vehicular body frame; 3 work implement; 4 traveling unit; 5 cab; 6 bucket; 6a cutting edge; 10 boom pin; 13 steering cylinder; 14 boom; 15 tilt rod; 16 boom cylinder; 17 bucket pin; 18 bell crank; 18a support pin; 19 tilt cylinder; 20 engine; 21 input shaft; 22 motive power extraction unit; 23 motive power transmission mechanism; 23a output shaft; 24 cylinder driving unit; 25 work implement pump; 26 control valve; 27 vehicle speed detection unit; 28a first hydraulic pressure detector; 29 first angle detector; 30 first processor; 30j storage; 31 temperature sensor; 40, 72 display; 45 output unit; 48 second angle detector; 49 forward and rearward travel switching apparatus; 49a forward and rearward travel switching operation member; 49b forward and rearward travel switching detection sensor; 51 accelerator operation apparatus; 51a accelerator operation member; 51b accelerator operation detection unit; 52 boom operation apparatus; 52a boom operation member; 52b boom operation detection unit; 53 shift change operation apparatus; 53a shift change operation member; 53b shift change operation detection unit; 54 bucket operation apparatus; 54a bucket operation member; 54b bucket operation detection unit; 55 articulation operation apparatus; 55a articulation operation member; 55b articulation operation detection unit; 58 brake operation apparatus; 58a brake operation member; 58b brake operation detection unit; 60 pivot mechanism; 61 articulation angle sensor; 64 position detection sensor; 70 second processor; 71 input unit; 73 memory; 74 communication unit; 80 selector; 82 motion image generator; 84 display controller; 86 event determination unit; 88 event registration unit

The invention claimed is:

1. A display system of a work machine including a display, a processor, a memory, and a storage, the processor executing a program stored in the memory to perform the method comprising:
   storing, in the storage, time-series work machine motion information including motion information of the work machine;
   generating a motion image of the work machine based on the work machine motion information, wherein the motion information of the work machine includes a working state of an operation member of the work machine;
   displaying on the display that shows the motion image;
   selecting a time for playing the motion image on the display, the time stored in association with the work machine motion, and
   generating the motion image of the work machine based on the work machine motion information, in accordance with the selected time, wherein the motion image includes an image and one or both of a graph and a heat map based on the working state of the operation member of the work machine, the one or both of the graph and the heat map depicting performance on the operation member of the work machine over the selected time.

2. The display system of the work machine according to claim 1, wherein
   the storage is provided in any one of the work machine and an external device independent of the work machine.

3. The display system of the work machine according to claim 1, wherein the processor executing the program stored in the memory to perform the method further comprising:
   determining whether an event has occurred based on the work machine motion information; and
   storing, in the storage and in association with the work machine motion information, the determined event.

4. The display system of the work machine according to claim 3, wherein the processor executing the program stored in the memory to perform the method further comprising:
   selecting a time for playing the work machine motion information in accordance with the event that has occurred.

5. The display system of the work machine according to claim 4, wherein the processor executing the program stored in the memory to perform the method further comprising:
   displaying, on the display, the event that has occurred; and
   selecting the time for playing the work machine motion information in accordance with an input command for the event that has occurred.

6. The display system of the work machine according to claim 1, wherein selecting the time for playing the motion image on the display is based on an input command.

7. The display system of the work machine according to claim 1, wherein
   the processor and the memory are provided in any one of the work machine and an external device independent of the work machine.

8. The display system of the work machine according to claim 1, wherein
   the display is provided in any one of the work machine and an external device independent of the work machine.

9. The display system of the work machine according to claim 1, wherein
   the work machine includes a work implement and a machine main body, and
   the motion information of the work machine includes motion information of at least one of the work implement and the machine main body.

10. The display system of the work machine according to claim 1, wherein
    the work machine includes a work implement and a machine main body, and
    the motion information of the work machine includes operation information of at least one of the work implement and the machine main body.

11. The display system of the work machine according to claim 10, wherein
    the generated motion image shows change over time in operations of the work machine based on the operation information.

12. The display system according to claim 1, wherein
    the motion information of the work machine includes position information of the work machine.

13. The display system of the work machine according to claim 12, wherein
    the generated motion image of the work machine shows a position of works by the work machine on a map based on the position information.

14. The display system of the work machine according to claim 13, wherein the processor executing the program stored in the memory to perform the method further comprising:
    selecting a time for playing the work machine motion information corresponding to an input command indicating the position information of the work machine.

15. The display system of the work machine according to claim 1, wherein
    the work machine motion information further includes identification information.

16. The display system of the work machine according to claim 1, wherein
    the work machine is a wheel loader.

17. The display system of the work machine according to claim 1, wherein
    the motion image is generated showing a motion state of the work machine and an operation state corresponding to the motion state based on the work machine motion information.

18. The display system of the work machine according to claim 1, wherein
    the motion information includes inclination information of the machine main body and the motion image includes an inclined state image.

19. A method of controlling a display system of a work machine comprising:
    storing time-series work machine motion information including motion information of the work machine;
    generating a motion image of the work machine based on the work machine motion information, wherein the motion information of the work machine includes a working state of an operation member of the work machine;
    showing the motion image;
    selecting a time for playing the motion image, the time stored in association with the work machine motion, and
    generating the motion image of the work machine based on the work machine motion information, in accordance with the selected time, wherein the motion image includes an image and one or both of a graph and a heat map based on the working state of the operation member of the work machine, the one or both of the graph and the heat map depicting performance on the operation member of the work machine over the selected time.

* * * * *